US012206647B2

United States Patent
Kochhar et al.

(10) Patent No.: US 12,206,647 B2
(45) Date of Patent: Jan. 21, 2025

(54) DYNAMIC VARIANCE MECHANISM FOR SECURING ENTERPRISE RESOURCES USING A VIRTUAL PRIVATE NETWORK

(71) Applicant: Omnissa, LLC, Mountain View, CA (US)

(72) Inventors: Arjun Kochhar, Bangalore (IN); Suman Aluvala, Bangalore (IN); Amit Yadav, Bangalore (IN); Aman Srivastava, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 17/824,054

(22) Filed: May 25, 2022

(65) Prior Publication Data

US 2022/0286435 A1    Sep. 8, 2022

Related U.S. Application Data

(63) Continuation of application No. 16/788,325, filed on Feb. 12, 2020, now Pat. No. 11,418,488.

(30) Foreign Application Priority Data

Dec. 13, 2019  (IN) .............................. 201941051804

(51) Int. Cl.
| | | |
|---|---|---|
| *H04L 9/40* | (2022.01) | |
| *G06N 20/00* | (2019.01) | |
| *H04W 12/40* | (2021.01) | |

(52) U.S. Cl.
CPC ......... *H04L 63/0272* (2013.01); *G06N 20/00* (2019.01); *H04W 12/40* (2021.01)

(58) Field of Classification Search
CPC .... H04L 63/0272; G06N 20/00; H04W 12/40
(Continued)

(56) References Cited

U.S. PATENT DOCUMENTS

| | | | | |
|---|---|---|---|---|
| 8,649,768 | B1 * | 2/2014 | Gaddam ................. | H04M 3/38 455/414.1 |
| 9,843,934 | B1 * | 12/2017 | Jiang ..................... | H04W 12/12 |

(Continued)

FOREIGN PATENT DOCUMENTS

| | | |
|---|---|---|
| CA | 2759732 A1 | 10/2010 |
| CN | 108293046 A | 7/2018 |

(Continued)

OTHER PUBLICATIONS

Priya, "Behavioral Biometrics based Authentication System using MLP-NN and MVPA," 2021 IEEE International Power and Renewable Energy Conference (IPRECON), Kollam, India, 2021, pp. 1-6, doi: 10.1109/IPRECON52453.2021.9640941. (Year: 2021).*

(Continued)

*Primary Examiner* — Peter C Shaw
(74) *Attorney, Agent, or Firm* — Kim & Stewart LLP (57) ABSTRACT

Disclosed are various examples for securing enterprise resources using a virtual private network. At least one computing device that can authenticate a client device for a virtual private network (VPN) connection based on a first device identifier received from the client device and a second device identifier received from a remote management service. The at least one computing device can determine that a network event associated with the client device has been observed and execute a machine learning routine to identify a pattern of access for the client device. A network access anomaly is determined in response to a network interaction of the client device deviating from the pattern of access for the client device. A remedial action is performed based on an anomaly type associated with the network access anomaly.

20 Claims, 6 Drawing Sheets

(58) Field of Classification Search
USPC .......................................................... 726/15
See application file for complete search history.

(56) References Cited

U.S. PATENT DOCUMENTS

| | | | |
|---|---|---|---|
| 9,942,200 B1* | 4/2018 | Tan | H04L 63/0281 |
| 10,064,055 B2 | 8/2018 | Raleigh et al. | |
| 10,129,269 B1* | 11/2018 | Ford | H04L 67/535 |
| 11,297,078 B2* | 4/2022 | Johnson | G06N 5/025 |
| 2004/0022245 A1 | 2/2004 | Forbes et al. | |
| 2004/0022257 A1 | 2/2004 | Green et al. | |
| 2004/0148326 A1 | 7/2004 | Nadgir et al. | |
| 2009/0292816 A1 | 11/2009 | Etchegoyen et al. | |
| 2010/0325711 A1 | 12/2010 | Etchegoyen | |
| 2012/0209951 A1 | 8/2012 | Enns et al. | |
| 2013/0097674 A1* | 4/2013 | Jindal | H04W 12/068 709/227 |
| 2017/0109840 A1* | 4/2017 | Lu | H04W 12/02 |
| 2017/0201531 A1* | 7/2017 | Kim | H04L 63/0209 |
| 2017/0289134 A1* | 10/2017 | Bradley | H04L 63/105 |
| 2018/0212930 A1* | 7/2018 | Cammisa | H04L 63/0281 |
| 2019/0356650 A1* | 11/2019 | Leavy | H04L 63/06 |
| 2021/0144780 A1* | 5/2021 | Hao | H04W 76/10 |

FOREIGN PATENT DOCUMENTS

| | | | | |
|---|---|---|---|---|
| JP | 4713186 B2 | 9/2006 | | |
| WO | WO-02073877 A2 * | 9/2002 | | G06Q 20/341 |
| WO | WO-2022027048 A1 * | 2/2022 | | H04L 63/0815 |

OTHER PUBLICATIONS

Sharghi et al.i, "A User Behavior-Based Approach to Detect the Insider Threat in Distributed Diagnostic Imaging Systems," 2016 IEEE 29th International Symposium on Computer-Based Medical Systems (CBMS), Belfast and Dublin, Ireland, 2016, pp. 300-305, doi: 10.1109/CBMS.2016.58. (Year: 2016).*

Ashibani et al., "A Behavior Profiling Model for User Authentication in IoT Networks based on App Usage Patterns," IECON 2018—44th Annual Conference of the IEEE Industrial Electronics Society, Washington, DC, USA, 2018, pp. 2841-2846, doi: 10.1109/IECON.2018.8592761. (Year: 2018).*

Lu et al., "An user behavior credibility authentication model in cloud computing environment," Proceedings of 2nd International Conference on Information Technology and Electronic Commerce, Dalian, China, 2014, pp. 271-275, doi: 10.1109/ICITEC.2014.7105617. (Year: 2014).*

Salunke et al., "Transfer Learning for Behavioral Biometrics-based Continuous User Authentication," 2022 International Symposium on Networks, Computers and Communications (ISNCC), Shenzhen, China, 2022, pp. 1-6, doi: 10.1109/ISNCC55209.2022.9851764. (Year: 2022).*

Zhao et al., "Bayesian Statistical Inference in Machine Learning Anomaly Detection," 2010 International Conference on Communications and Intelligence Information Security, Xi'an, China, 2010, pp. 113-116, doi: 10.1109/ICCIIS.2010.48. (Year: 2010).*

Mihailescu et al., "Unveiling Threats: Leveraging User Behavior Analysis for Enhanced Cybersecurity," 2023 15th International Conference on Electronics, Computers and Artificial Intelligence (ECAI), Bucharest, Romania, 2023, pp. 01-06, doi: 10.1109/ECAI58194.2023.10194039. (Year: 2023).*

Ding et al., "Detection of Anomaly User Behaviors Based on Deep Neural Networks," 2021 IEEE 20th International Conference on Trust, Security and Privacy in Computing and Communications (TrustCom), Shenyang, China, 2021, pp. 1240-1245, doi: 10.1109/TrustCom53373.2021.00169. (Year: 2021).*

Khan et al., "Using Ensemble Learning for Securing Public Area Networks from VPN Malicious Transmissions," IEEE, Chennai, India, 2023, pp. 1-6, doi: 10.1109/RMKMATE59243.2023.10368897. (Year: 2023).*

Yanqin et al., "Design and Optimization of VPN Security Gateway," 2006 First International Conference on Communications and Networking in China, Beijing, China, 2006, pp. 1-4, doi: 10.1109/CHINACOM.2006.344676. (Year: 2006).*

Mimura et al., "Behavior Shaver: An Application Based Layer 3 VPN that Conceals Traffic Patterns Using SCTP," 2010 International Conference on Broadband, Wireless Computing, Communication and Applications, Fukuoka, Japan, 2010, pp. 666-671, doi: 10.1109/BWCCA.2010.152. (Year: 2010).*

Katulanda et al., "Machine Learning Based Web Application Plugin for Threat Detection and IP Analysis," 2023 5th International Conference on Advancements in Computing (ICAC), Colombo, Sri Lanka, 2023, pp. 17-22, doi: 10.1109/ICAC60630.2023.10417658. (Year: 2023).*

Rogers, Dean. "Orthus authentication protocol: Background services." 2016 IEEE Symposium Series on Computational Intelligence (SSCI). IEEE, 2016.

Small, S., et al. "Scalable VPNs for the global information grid." MILCOM 2005-2005 IEEE Military Communications Conference. IEEE, 2005.

Wangensteen, Audun, Lars Lunde, and Ivar Jorstad. "Secured enterprise access with strong SIM authentication." 2006 10th IEEE International Enterprise Distributed Object Computing Conference (EDOC'06). IEEE, 2006.

* cited by examiner

DYNAMIC VARIANCE MECHANISM FOR SECURING ENTERPRISE RESOURCES USING A VIRTUAL PRIVATE NETWORK

CROSS-REFERENCE TO RELATED APPLICATIONS

This application claims the benefit of, and priority to, U.S. Non-Provisional patent application Ser. No. 16/788,325, entitled, "DYNAMIC VARIANCE MECHANISM FOR SECURING ENTERPRISE RESOURCES USING A VIRTUAL PRIVATE NETWORK," filed on Feb. 12, 2020, issued on Aug. 16, 2022, as U.S. Pat. No. 11,418,488, which is incorporated herein by reference in its entirety.

BACKGROUND

In enterprise settings, individuals can utilize a number of different services and applications in order to complete tasks for an enterprise or other organization. In some instances, employees or other individuals of enterprises utilize a virtual private network (VPN) to access enterprise resources, such as word processing documents, spreadsheets, and other data. For instance, an individual can use a VPN on a home network to access enterprise resources in an enterprise network.

Securing access to enterprise resources is an objective of any enterprise. As more and more resources are made available for employees or other individuals to access, it is becoming increasingly important to add regular and periodic checks to ensure that enterprise data, which can be confidential or proprietary in nature, is not exposed or compromised when accessed by client devices. For instance, individuals tend to be prone to leaving their devices unlocked and unmanaged, thereby creating opportunities for attackers to obtain enterprise resources, resulting in proprietary data being lost or unintentionally disseminated.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to a dynamic variance mechanism for securing enterprise resources using a virtual private network. Administrators of enterprises and other organization commonly employ various mechanisms to secure access to enterprise data, such as requiring double-factor authentication, implementing encryption, requiring digital security certificates, and forcing employees to adopt other security mechanisms. As enterprise data is increasingly provided to employees or other individuals to access, it is becoming progressively important to add regular and periodic checks to ensure that enterprise data is not exposed or compromised when accessed by client devices, especially mobile client devices. For instance, individuals tend to be prone to leaving their device unlocked and unmanaged, thereby creating opportunities for attackers to obtain enterprise resources, resulting in proprietary data being lost or unintentionally disseminated. As such, various examples are described herein for a dynamic variance mechanism to validate client devices using cryptographic keys, detect anomalies based on interactions performed on the client devices, and periodically re-authenticate the client devices to ensure legitimate users are accessing resources.

According to various examples described herein, when a virtual private network (VPN) application is first executed on a client device, the client device can generate and send a first unique device identifier to the remote management service. The remote management service can be configured to store the first unique device identifier in association with a second unique universal identifier which can be used in authenticating the client device in the future.

For instance, when the virtual private network application is subsequently executed, the client device can send the first unique identifier and the second unique identifier to a virtual private network service for authentication. The virtual private network service can be configured to authenticate the client device using the first unique device identifier and the second unique device identifier. For instance, the virtual private network service can compare at least one of the first unique device identifier and the second unique device identifier to a device identifier received from the remote management service to ensure device identifiers match those stored by the management service. If the device identifier received from the remote management service does not match at least one of the first unique device identifier and the second unique device identifier, the client device or the virtual private network service can terminate a virtual private network connection on the client device, thereby denying access to enterprise data.

In some examples, the client device can generate the first unique device identifier as a function of an application signing key, a device model, a user enrollment mode, and a unique hash generated from a network service unique identifier for the client device. For instance, the network service unique identifier for the client device can include an international mobile equipment identity (IMEI) identifier or a mobile equipment identifier (MEID). Also, the second unique device identifier can include a universally unique device identifier (UUID).

In some examples, the second unique device identifier for the client device is generated by the remote management service in response to an enrollment of the client device with the remote management service. Further, in various examples, when the virtual private network application is subsequently executed, the first unique identifier and the second unique identifier are sent to the virtual private network service after completion of a secure sockets layer (SSL) handshake between the virtual private network service and the client device.

In further examples, the virtual private network service can further maintain an access log for the client device detailing a network access history of the client device, and identify at least one pattern of access for the client device based on the access log. As such, in some examples, the virtual private network service can identify anomalies on the client device. For instance, the virtual private network service can execute a machine learning (ML) routine to identify the at least one pattern of access for the client device and identify a network access anomaly in response to a network interaction of the client device deviating from the at least one pattern of access for the client device.

When a network access anomaly is identified, one of the client device, the virtual private network service, or the management service can perform at least one remedial action. For instance, the at least one remedial action can be determined based at least in part on an administrator-defined policy. Further, the machine learning routine can be one of a K-nearest neighbor routine, a one class support vector machine (SVM) routine, an auto-encoder neural network routine, a one-class neural network (OC-NN) routine, or other suitable machine learning routine.

Figure 1:
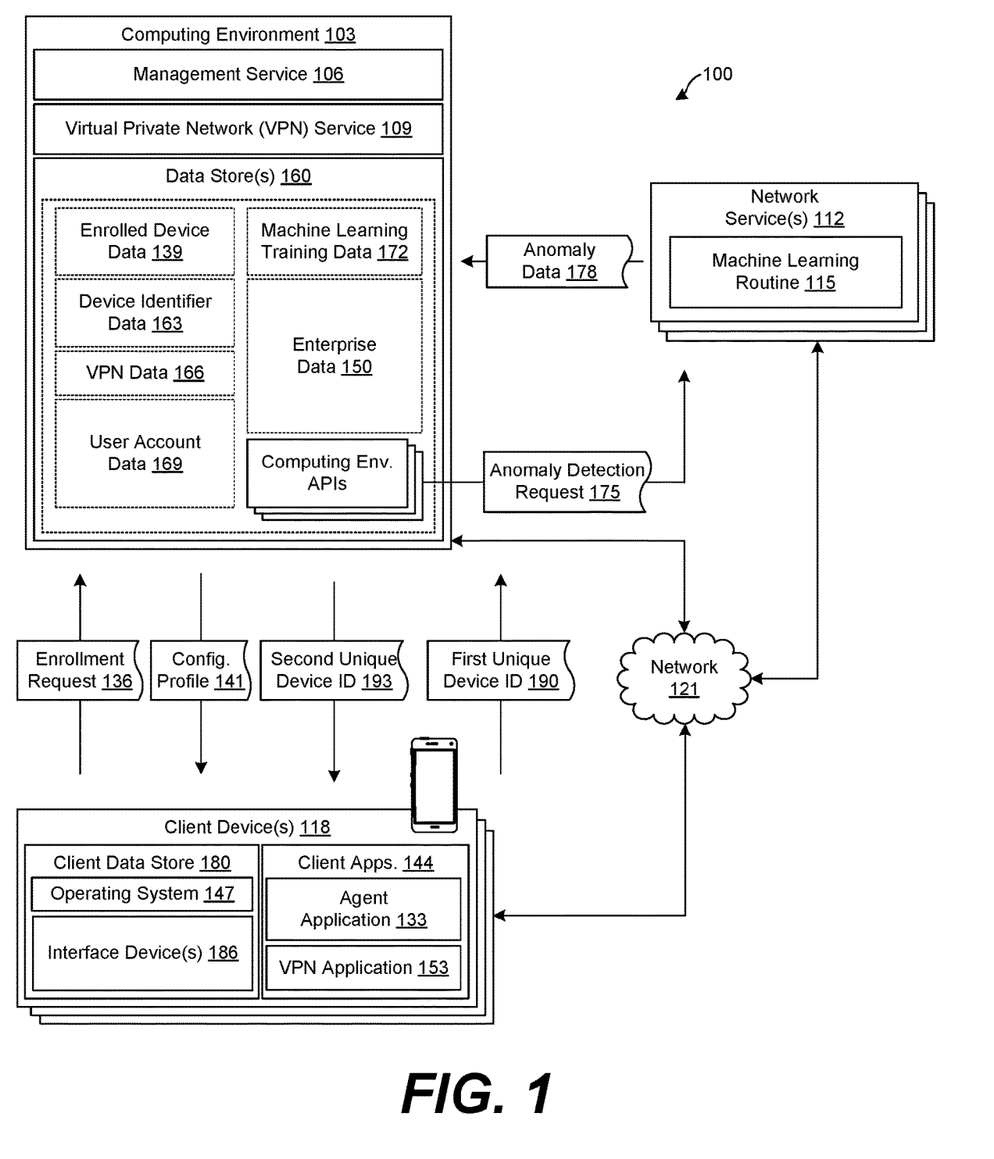
FIG. 1 is a drawing of an example of a networked environment, including a computing environment, a client device, network services, and other components in communication over a network.

With reference to FIG. 1, an example of a networked environment 100 is shown. The networked environment 100 can include a computing environment 103 executing a management service 106 and a virtual private network service 109, network services 112 executing a machine learning routine 115, and client devices 118 in communication through a network 121.

The network 121 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 121 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 121 can also include a combination of two or more networks 121. Examples of networks 121 can include the Internet, intranets, extranets, virtual private networks, and other similar networks.

The computing environment 103 executing the management service 106 and the virtual private network service 109 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components.

The computing environment 103 can include a grid computing resource or any other distributed computing arrangement. The computing environment 103 can also include, or be operated as, one or more virtualized computer instances. For purposes of convenience, the computing environment 103 is referred to herein in the singular. The components executed on the computing environment 103 can include the management service 106 and the virtual private network service 109, as well as other applications, services, processes, systems, engines, or functionality not discussed in detail herein.

Generally, the management service 106 can manage and oversee the operation of client devices 118, for instance, those enrolled or to be enrolled with the management service 106. In some examples, an organization, such as a company, enterprise, organization, or other entity can operate the management service 106 to manage or oversee the operation of the client devices 118 of its employees, contractors, customers, or other individuals having accounts with the entity. In some examples, various settings and tasks performed by the management service 106 can be defined by administrators of the management service 106.

For example, if the management service 106 is used to oversee client devices 118 of employees of an enterprise, the administrators can include information technology personnel of the organization tasked with overseeing operation of the client devices 118 enrolled with the management service 106. To this end, the management service 106 can provide an administrator console that permits administrators to define policies, compliance rules, and other criteria for a client device 118 to remain in compliance with the management service 106. Additionally, through the administrator console, the administrators can specify configurations of the client devices 118 that can be carried out through interaction with an agent application 133 on each of the client devices 118. Accordingly, the management service 106 can include a unified endpoint management (UEM) service in some examples.

To enroll a client device 118 with the management service, an agent application 133 executable on the client device 118 can generate an enrollment request 136 for transmission to the computing environment 103. Enrollment can include authenticating the client device 118 using login information, such as an email address, username, or password, as well as device information or biometric information, and storing information associated with the client device 118 in a data store 160 as enrolled device data 139. Further, enrollment can include sending a configuration profile 141 to the client device 118 that directs the agent application 133 to configure the client device 118 in accordance with settings specified by the administrator in the administrator console, as defined in the configuration profile 141.

The agent application 133 can include one of several client applications 144 on the client device 118. However, the agent application 133 can vary from other client applications 144 as it has the ability to be registered as a trusted device administrator of the client device 118 through management application programming interfaces (APIs) of an operating system 147, which can provide the agent application 133 with privileges to control operation of various functions of the client device 118 that are otherwise unable to be performed by non-privileged client applications 144. The agent application 133 can configure a client device 118 in accordance with data provided to the client device 118 for the management service 106, referred to as a configuration profile 141. In some examples, the configuration profile 141 can include an extensible markup language (XML) document, JSON data object, or other similar data that causes the agent application 133 to configure the client device 118 in accordance with settings or other parameters specified therein.

Further, the management service 106 can serve up enterprise data 150, such as email data, calendar data, reminder data, messaging data, document data, as well as other data to individuals on their respective client devices 118. To this end, the management service 106 can be utilized by one or more enterprises, units thereof, or other organizations. The management service 106 can be part of a local network, trusted network, or intranet, which can be separate from the other components of the networked environment 103 in various examples.

When a client device 118 is outside of an enterprise network, the management service 106 can require the client device 118 to utilize a virtual private network to form a tunnel between a network utilized by the client device 118 and an enterprise network. As such, the client device 118 can include a virtual private network application 153 as one of the client applications 144. The virtual private network application 153 interacts with the virtual private network service 109 to provide a tunnel that encapsulates data transmitted between the computing environment 103 and the client device 118 in one or more encrypted data packets.

The computing environment 103 can include a data store 160, which can include any storage device or medium that can contain, store, or maintain the instructions, logic, or applications described herein for use by or in connection with the computing environment 103. The data store 160 can be a hard drive or disk of a host, server computer, or any other system providing storage capability. In some examples, the data store 160 can include a network storage service, for instance, provided by the network service 112. While referred to in the singular, the data store 160 can include a plurality of storage devices that are arranged in one or more hosts, server banks, computer banks, or other arrangements. The data store 160 can include any one of many physical media, such as magnetic, optical, or semiconductor media. Other examples include solid-state drives or flash memory.

The data store 160 can include memory of the computing environment 103, mass storage resources of the computing environment 103, or any other storage resources on which data can be stored by the computing environment 103. The data stored in the data store 160 can include, for example, enrolled device data 139, enterprise data 150, as well as device identifier data 163, virtual private network data 166, user account data 169, machine learning training data 172, and other data.

Enrolled device data 139 can include information associated with client devices 118 enrolled, or to be enrolled, with the management service 106. In some examples, enrolled device data 139 can include device profiles periodically generated by the agent application 133. The device profiles describe a current configuration of a client device 118, such as settings, drivers, applications installed thereon, and other information associated with a client device 118. Device identifier data 163 can include unique device identifiers that can be used to authenticate client device 118, as will be described.

Virtual private network data 166 can include encryption keys as well as other data for sending encrypted traffic between a client device 118 and the virtual private network service 109. User account data 169 can include data associated with employees of the enterprise or other individuals having access to enterprise data 150. As such, the user accounts data 169 can include data such as email address, organizational unit, first name, middle name, last name, authentication data, as well as other data.

Machine learning training data 172 can include data used to train a machine learning routine 115. In some examples, the machine learning training data 172 includes historical data describing past interactions with client devices 118, where the data is curated by administrators. In other words, the machine learning training data 172 includes manually verified data regarding anomalies identified based on unusually or non-conforming interactions with the client devices 118.

Once trained using machine learning training data 172, the machine learning routine 115 can identify network access anomalies when network interactions are performed on the client devices 118 that deviate from patterns of access for the client device 118. For instance, if a user habitually accesses a particular subset of the client applications 144, the machine learning routine 115 can identify when a client application 144 outside of the subset is executed, thereby triggering an anomaly. When anomalies are identified, the computing environment 103 can direct one or more remedial actions to be performed. Remedial actions can include reauthenticating the client device 118, sending a notification to a user of the client device 118 to provide authentication credentials, or similar action.

The network services 112 can include web applications, web services, or other network facing applications. One or more network services 112 can be provided by the same provider or by different providers. While shown in FIG. 1 as being separate from the computing environment 103, in some examples, the network services 112, such as the machine learning routine 115, include services offered in the computing environment 103. Alternatively, the network services 112 can include one or more network services offered by a third-party, such as a machine learning software provider.

In some examples, the network services 112 can receive anomaly detection requests 175 from the computing environment 103 and, in return, provide anomaly data 178. Anomaly data 178 can include one or more anomalies identified based on a user-based interaction with the client device 118 or an interaction with a website or other network service over the network 121.

To provide anomaly data 178 to the computing environment 103, the machine learning routine 115 can utilize historical data describing the user-based interaction with the client device 118 or an interaction with a website or other network service over the network 121. Using the historical data, the machine learning routine 115 can determine whether portions of the interactions with the client device 118 are unusual or otherwise not in conformance with a pattern of access.

The client device 118 can be representative of one or more client devices 118. The client device 118 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 118 can include an operating system 147 that can perform management functionalities and execute client applications 144. The operating system 147 can be stored in a client data store 180 that also includes the client applications 144. The client applications 144 can include the agent application 133 and a virtual private network application 153, among other applications.

The client device 118 can be equipped with networking capability or networking interfaces, including a localized networking or communication capability, such as a near-field communication (NFC) capability, radio-frequency identification (RFID) read or write capability, or other localized communication capability. In some embodiments, the client device 118 is mobile where the client device 118 is easily portable from one location to another, such as a smart phone, tablet, or laptop computer. In other situations, the client device 118 can be a desktop machine or a kiosk at a particular location. The client device 118 can include interface devices 186 that can be utilized to interact with users. The interface devices 186 can include, for example, audio devices, client displays, and haptic devices, such as keyboards, touch screen displays, and other similar devices.

The operating system 147 of the client device 118 can execute various client functionalities or client applications 144, such as the agent application 133, a browser application, a voice interaction functionality, or another application. The operating system 147 and some client applications 144 can access network content served up by the computing environment 103, or other servers and can present this information to a user on a display. For example, the client device 118 can render a user interface on a liquid crystal display (LCD), organic light emitting diode (OLED) display, touch-screen display, or other type of display device. The client device 118 can also present audio information using the audio device, and can provide haptic or physical feedback using a haptic device.

Some client applications 144 can include a browser or a dedicated application, and a user interface can include a network page, an application screen, or other interface. The client device 118 can also access web applications using a browser application. Further, other client applications 144 can include device management applications, enterprise applications, social networking applications, word processors, spreadsheet applications, media player applications, or other applications.

In some examples, one of the client applications 144 includes the agent application 133 that enrolls the client device 118 with the computing environment 103. The agent application 133 can perform actions as directed by the computing environment 103, for instance, by checking in with the management service 106 or other management service of the computing environment 103, retrieving a command from a command queue, and implementing retrieved commands on the client device 118. In some examples, the management service 106 can send a configuration profile 141 to an operating system 147 of the client device 118 that causes the agent application 133 to obtain administrator privileges on the client device 118.

The virtual private network service 109 can verify that a client device 118 is authenticated when the client device 118 initially tries to connect to the virtual private network service 109. Accordingly, in some examples, the virtual private network application 153 on the client device 118 can generate a first unique device identifier 190 and a second unique device identifier 193 that can be used to subsequently authenticate a client device 118, as will be described.

The first unique device identifier 190, also referred to herein as an alpha identifier, can be generated as a function of an application signing key, a device model, a user enrollment mode, a unique hash generated from a network service unique identifier for the client device, or any combination thereof. The network service unique identifier can include an IMEI identifier, an MEID identifier, or other identifier. As such, it is understood that the first unique device identifier 190 uniquely identifies the client device 118.

In some examples, the first unique device identifier 190 is generated upon a first launch or execution of the virtual private network application 153, and is sent to the management service 106. The computing environment 103 can map the first unique device identifier 190 to a second unique device identifier 193, which can include one generated or stored by the management service 106 when a client device 118 enrolls with the management service 106. The second unique device identifier 193 can be referred to herein as a beta identifier. In some examples, the second unique device identifier 193 includes a universally unique identifier. The first unique device identifier 190 and the second unique device identifier 193 can be used for authenticating the client device 118 and/or virtual private network sessions, as will be described.

Figure 2A:
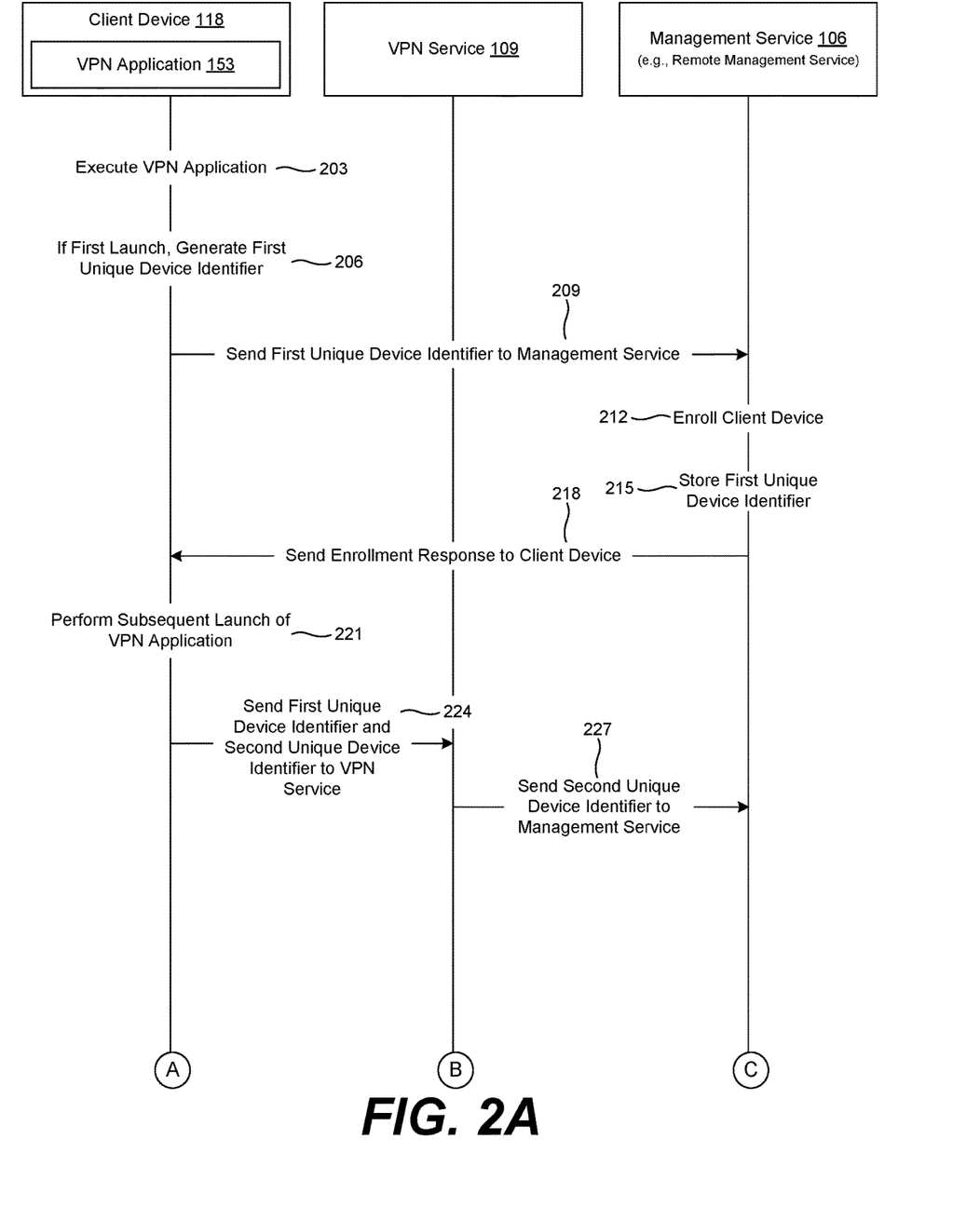
FIGS. 2A and 2B are a sequence diagram illustrating an example of a dynamic variance mechanism for securing enterprise resources using a virtual private network.
Figure 2B:
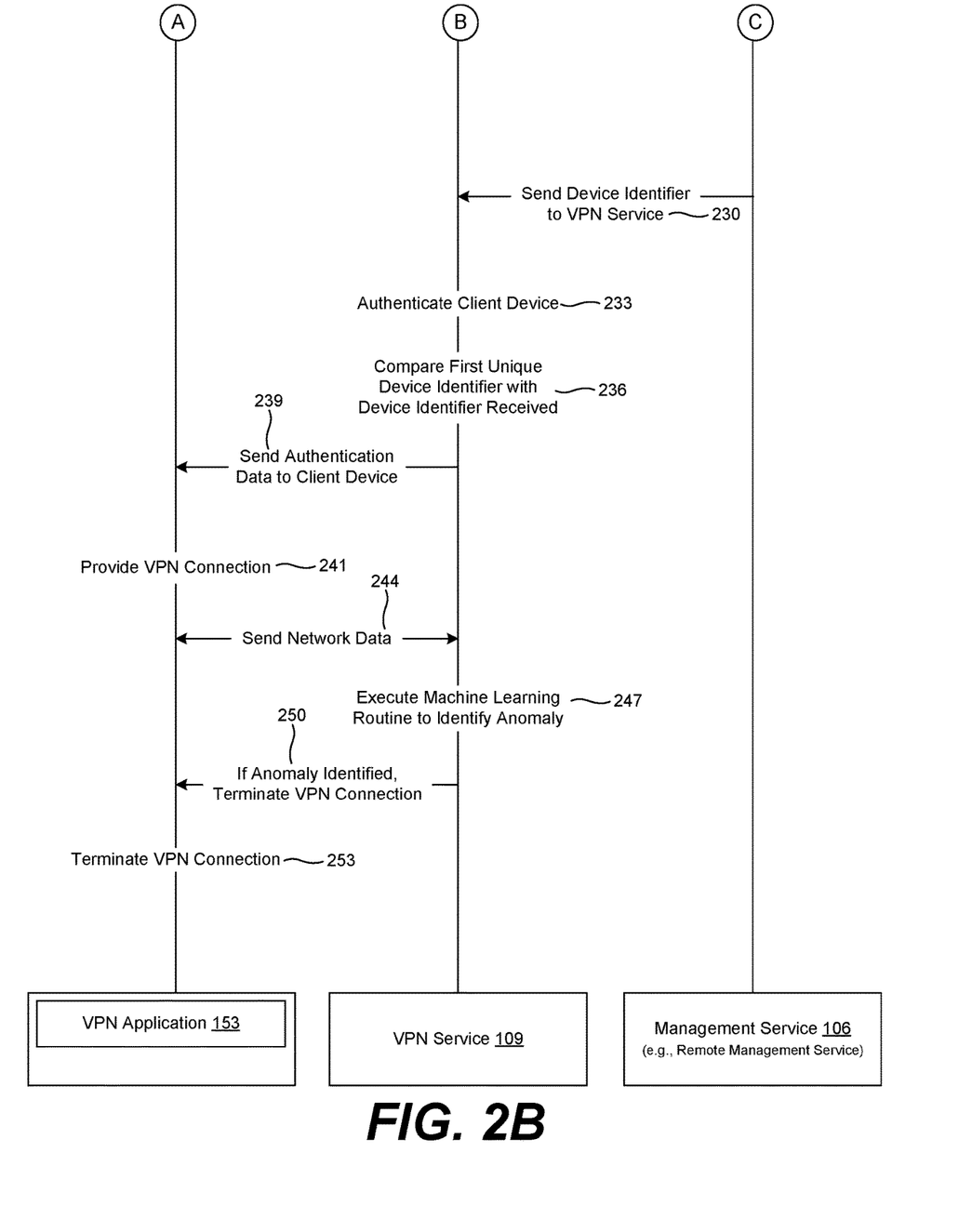

Turning now to FIGS. 2A and 2B, an example of a sequence diagram is shown that illustrates a dynamic mechanism for securing enterprise data 150 using a virtual private network. Beginning with step 203, the client device 118 can execute the virtual private network application 153, for instance, when a user of the client device 118 selects the virtual private network application 153 in an application list provided by the operating system 147 or, for instance, when a user of the client device 118 attempts to access enterprise data 150 using one of the client applications 144 of the client device 118.

Next, in step 206, the virtual private network application 153 can determine whether the execution is a "first execution" or a "first launch." If the execution is not a first execution, the process will skip to step 221. However, if the execution of the virtual private network application 153 is the first execution, the virtual private network application 153 can generate a first unique device identifier 190. In some examples, the virtual private network application 153 generates the first unique device identifier 190 as a function of an application signing key, a device model, a user enrollment mode, a unique hash generated from a network service unique identifier for the client device, any combination thereof, or other information that is unique to the client device 118. The network service unique identifier can include an IMEI identifier, an MEID identifier, or other identifier. As such, it is understood that the first unique device identifier 190 uniquely identifies the client device 118.

In step 209, the virtual private network application 153 can send the first unique device identifier 190 to the management service 106. In step 212, the management service 106 can store the first unique device identifier 190 in the data store 140, for instance, in association with the client device 118. Additionally, the management service 106 can map the first unique device identifier 190 to a second unique device identifier 193, which can include one generated by the management service 106 when a client device 118 enrolls with the management service 106. In some examples, the second unique device identifier 193 includes a UUID.

In step 218, the management service 106 can send an enrollment response to a client device 118. For instance, when the client device 118 successfully enrolls with the management service 106, the management service 106 can send the second unique device identifier 193 to the client device 118 for storage in the client data store 180. In some examples, the enrollment response further includes a configuration profile 141, as well as other enrollment data.

In step 221, the client device 118 can perform a subsequent launch or execution of the virtual private network application 153. It is understood that a "subsequent launch" is any launch after the first launch and, as such, can include a second launch, a third launch, and so forth. It is further understood that the client device 118 has already generated the first unique device identifier 190. The subsequent launch of the virtual private network application 153 can be performed, for instance, when a user desires to establish a virtual private network session to access enterprise data 150. It is understood that the client device 118 must be authenticated to access the enterprise data 150.

As such, in step 224, the client device 118 can send the first unique device identifier 190 and the second unique device identifier 193 to the virtual private network service 109, which can be used by the virtual private network service 109 to authenticate the client device 118 and the soon-to-be-established virtual private network session. To authenticate the client device 118, in step 227, the virtual private network service 109 can send the second unique device identifier 193 to the management service 106, where the management service 106 maintains a mapping of the second unique device identifier 193, the first unique device identifier 190, and the client device 118.

Upon receipt of the second unique device identifier 193, the management service 106 can query a corresponding device identifier 193 and, in step 230, can send the corresponding device identifier to the virtual private network service 109 to complete the authentication of the client device 118. In some examples, when the virtual private network application 153 connects to the virtual private network service 109, the client device 118 sends the alpha identifier and the beta identifier to the virtual private network service 109 after an SSL handshake has been completed.

Upon receipt of the corresponding device identifier from the management service 106, the virtual private network service 109 can authenticate the client device 118 in step 233. In step 236, authenticating the client device 118 can include comparing the first unique device identifier 190 received from the client device 118 with the device identifier received from the management service 106. If the two identifiers match, the virtual private network service 109 can establish a virtual private network session. Otherwise, a connection is terminated, if any, or a connection is not established.

If authentication succeeds, the process can proceed to step 239. In step 239, the virtual private network service 109 can send authentication data to the client device 118. In step 241, upon receipt of the authentication data, the client device 118 can provide a virtual private network connection. In some examples, the virtual private network connection is one in which encrypted data is communicated between the client device 118 and the computing environment 103. In some examples, data packets comprising enterprise data 150 are encrypted during transmission over the network 121. Accordingly, in step 244, the client device 118 and the computing environment 103 can send network data between each other during the virtual private network connection.

The steps described above can ensure an attacker who may have access to device certificates will not be granted access from a different client device 118 since the first unique device identifier 190 as generated and stored on a client device 118 will be different for different client devices 118. Also, the steps described above account for instances in which an attacker is trying to access internal resources, such as enterprise data 150, from another client device 118 while having access to a VPN certificate of a client device 118. However, if an attacker were to momentarily have access to a client device 118, another security vulnerability can occur. In this case, the first unique device identifier 190 remains the same.

As such, a machine learning routine 115 can be employed to secure data even if an attacker were to gain access to a client device 118. In some examples, the virtual private network service 109 can maintain access logs anonymously. The access logs include individual instances of user interactions with the client device 118 or network resources. Further, the virtual private network service 109 can determine a standard normalized pattern of what users of the client devices 118 in an enterprise generally access. For example, from a client device 118, a user might generally browse software collaboration network sites, browse sports sites, etc., but will not generally download source code from various repositories.

Accordingly, in various examples, a machine learning routine 115 can be trained and utilized to perform anomaly detection. In step 247, the virtual private network service 109 can invoke or otherwise execute the machine learning routine 115 to identify one or more anomalies. In some examples, the machine learning routine 115 is trained over time to create a normalized pattern of user access to internal resources. As such, if an attacker were to gain access to client device 118, and were to try to download source code from a source code repository, the machine learning routine 115 can identify the download of the source code as an anomaly and report the anomaly to the virtual private network service 109.

In step 250, if an anomaly is identified, the virtual private network service 109 can terminate the virtual private network connection or perform another suitable remedial action. For instance, the virtual private network service 109 can send a control message to the virtual private network application 153 on the client device 118 directing the client device 118 to pause a flow of network traffic and re-authenticate a user of the client device 118. The virtual private network service 109 can, at the same time, direct an end the management service 106 to lock the client device 118 using, for instance, a UUID for the client device 118.

In further examples, the virtual private network application 153 can employ an enterprise identity manager to trigger user verification. For instance, the enterprise identity manager can send an email comprising a verification hyperlink to an enterprise email account for the user of the client device 118. If the user reauthenticates using the hyperlink, for example, an enterprise email client application, the virtual private network service 109 can notify the virtual private network application 153 indicating that the client device 118 has been verified. As such, the virtual private network connection can be reestablished.

In further examples, the hyperlink can be verified using an email client application on the client device 118. However, in some examples, the email client application is first configured with a single sign-on (SSO) timeout such that, when a user launches the email client application, the user will be posed with an authentication challenge. An authentication challenge can include providing enterprise management credentials, performing two-factor authentication, or other suitable authentication challenge as can be appreciated.

Notably, the virtual private network application 153 can send a control message to the virtual private network service 109 indicating that a user of the client device 118 has been authenticated, which causes the virtual private network service 109 to resume transmission of data packets. In some examples, while the virtual private network connection is paused to reauthenticate a client device 118, data packets are buffered. Additionally, upon reauthentication, the outlier can be added to the machine learning training data 172 to train and re-train the machine learning routine 115. As such, over a period of time, a number of false-positive alarms incidents will reduce.

Figure 3:
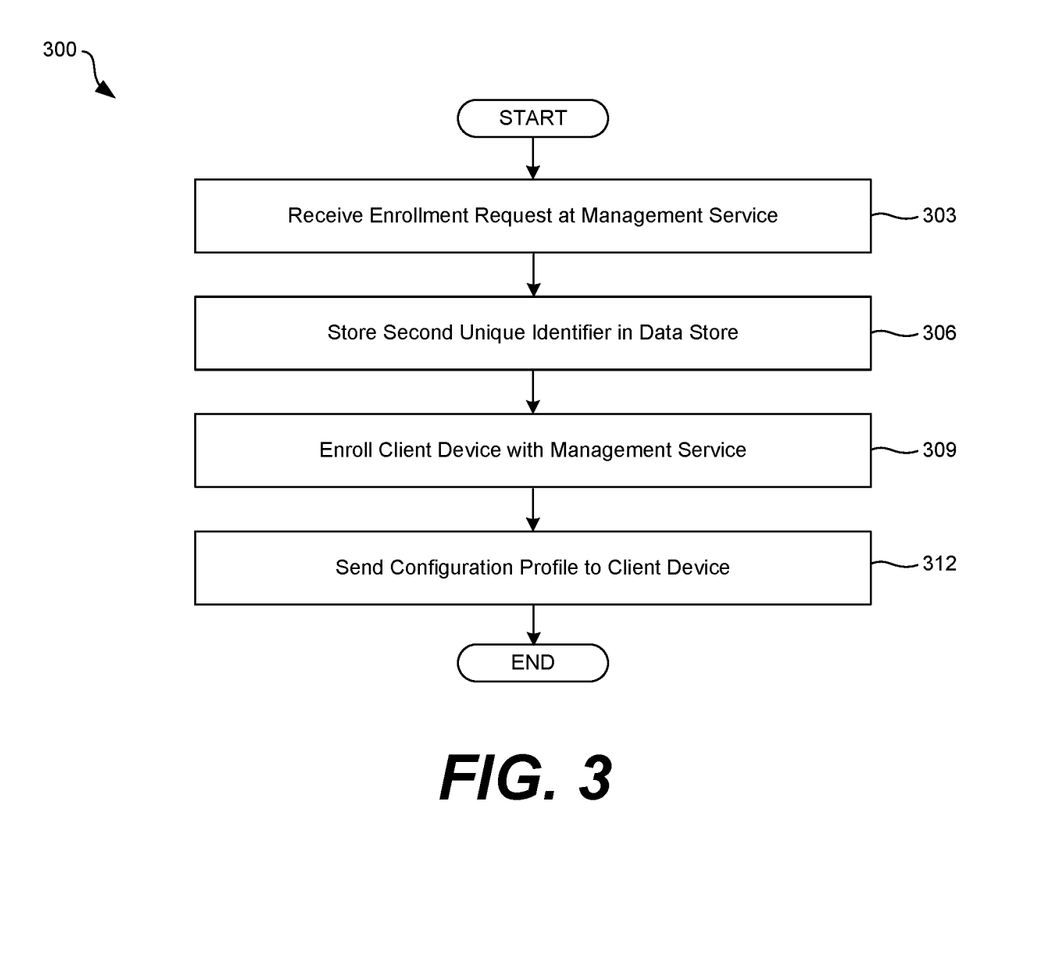
FIG. 3 is a drawing illustrating functionality implemented by a management service of the computing environment of FIG. 1.

Referring next to FIG. 3, a flowchart 300 is shown that provides one example operation of the management service 106 according to various examples. The flowchart of FIG. 3 can be viewed as depicting an example of elements of a method implemented by the computing environment 103 executing in the networked environment 100 according to one or more examples. The separation or segmentation of functionality as discussed herein is presented for illustrative purposes only.

Beginning with step 303, the management service 106 can receive an enrollment request 136 from a client device 118. In some examples, a user of the client device 118 enrolls his or her client device 118 by installing and launching an agent application 133 on the client device 118 that authenticates the user and sends information associated with the client device 118 to the management service 106. The management service 106 can store a UUID for the client device 118 as well as a device profile. Further, the management service 106 can determine whether the client device 118 complies with one or more compliance rules defined by administrators of an enterprise, for instance, by analyzing periodically-updated device profiles.

In step 306, the management service 106 can store the second unique device identifier 193 in the data store 160 in association with the client device 118. The second unique device identifier 193 can include a UUID in some examples. Further, in some instance, the second unique device identifier 193 can be used in authenticating a client device 118. For instance, when a client device 118 attempts to establish or maintain a virtual private network connection, the virtual private network service 109 can request a device identifier for the client device 118 from the management service 106 to compare against a second unique device identifier 193 provided directly from the client device 118. Accordingly, client devices 118 are unable to spoof or pose as other client devices 118, thereby increasing network security.

In step 309, the management service 106 can enroll the client device 118 with the management service 106. In some examples, enrollment can include storing data associated with the client device 118 in the data store 160. Additionally, in step 312, enrollment can include the management service 106 sending a configuration profile 141 to the client device 118. The agent application 133 can be configured such that receipt of the configuration profile 141 directs the agent application 133 to configure the client device 118 in accordance with settings specified by the administrator in the administrator console, as specified in the configuration profile 141. Thereafter, the process can proceed to completion.

Figure 4:
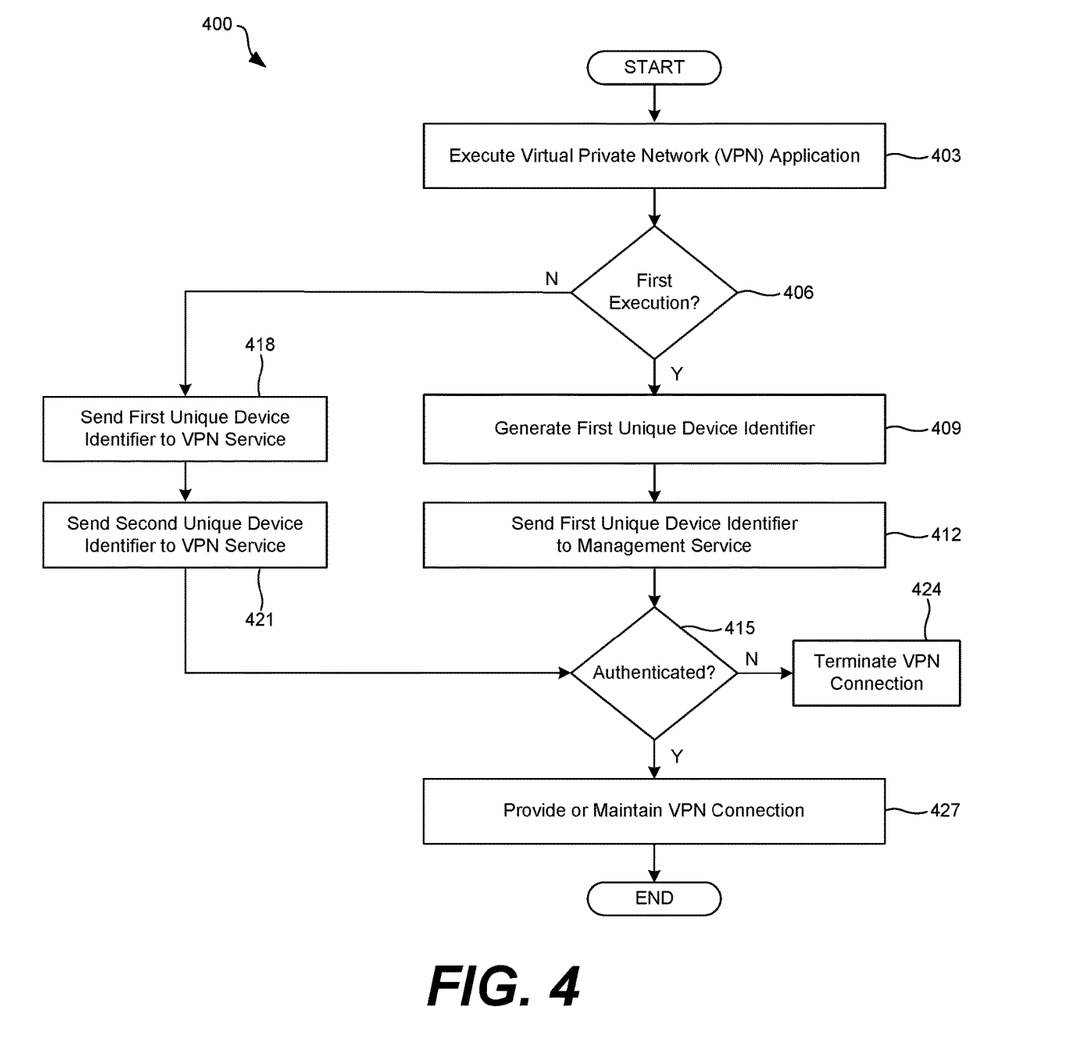
FIG. 4 is a drawing illustrating functionality implemented by a client device of the networked environment of FIG. 1.

Turning now to FIG. 4, a flowchart 400 is shown that provides one example operation of the client device 118 according to various examples. The flowchart of FIG. 4 can be viewed as depicting an example of elements of a method implemented by the client device 118 executing in the networked environment 100 according to one or more examples. The separation or segmentation of functionality as discussed herein is presented for illustrative purposes only.

In step 403, the client device 118 can execute a virtual private network application 153.

In step 406, the client device 118 can determine whether execution of the virtual private network application 153 is a first launch or first execution. In other words, the client device 118 can determine whether the virtual private network application 153 has been previously executed on the client device 118. In some examples, the client device 118 can identify whether the virtual private network application 153 has been executed based on presence (or lack thereof) of a flag set by the virtual private network application 153 upon a first execution. In some examples, the flag can be set in a predetermined location in memory, such as a predetermined file path or a predetermined keychain.

If the client device 118 determines that execution of the virtual private network application 153 is a first launch or first execution, the process can proceed to step 409. In step 409, the client device 118 can generate a first unique device identifier 190. In some examples, the virtual private network application 153 generates the first unique device identifier 190 as a function of an application signing key, a device model, a user enrollment mode, a unique hash generated from a network service unique identifier for the client device, any combination thereof, or other information that is unique to the client device 118, where the network service unique identifier can include an IMEI identifier, an MEID identifier, or other identifier. As such, it is understood that the first unique device identifier 190 is one that uniquely identifies the client device 118.

Next, in step 412, the client device 118 can send the first unique device identifier 190 to the management service 106. The management service 106 can store the first unique device identifier 190 in association with a second unique device identifier 193 stored for the client device 118. For instance, as the second unique device identifier 193 can include a UUID, the management service 106 would have stored the second unique device identifier 193 upon enrollment by the client device 118. Thereafter, the process can proceed to step 415.

Referring back to step 406, if the client device 118 determines that the virtual private network application 153 has been executed previously on the client device 118, the process can proceed to step 418. As the virtual private network application 153 has been executed previously, execution of the virtual private network application 153 can be referred to as a subsequent execution.

In step 418 and step 421, the client device 118 can send the first unique device identifier 190 and the second unique device identifier 193 to the virtual private network service 109. The virtual private network service 109 can utilize the first unique device identifier 190 and the second unique device identifier 193 in authenticating the client device 118.

For instance, the virtual private network service 109 can query the management service 106 for data pertaining to the client device 118 to determine whether the data conforms to that provided by the client device 118. More specifically, in some examples, authenticating the client device 118 can include comparing the first unique device identifier 190 received from the client device 118 with the device identifier received from the management service 106.

Accordingly, in step 415, the client device 118 can determine whether the client device 118 has been authenticated. In some examples, the client device 118 can receive a command from the virtual private network service 109 indicating whether the client device 118 has been authenticated, for instance, based on a comparison of the first unique device identifier 190 and/or the second unique device identifier 193, and one or more device identifiers provided from by the management service 106. Based on the results of the authentication, the process can proceed to one of step 424 or step 427.

For instance, if the client device 118 is not authenticated, the process can proceed to step 424. In step 424, a remedial action can be performed, such as terminating the virtual private network connection or denying establishment of a new virtual private network connection.

Alternatively, if the client device 118 was authenticated, the process can proceed to step 427. In step 427, the client device 118 can provide a new virtual private network connection or maintain an existing virtual private network connection, as can be appreciated. In some examples, the virtual private network connection is one in which encrypted data is communicated between the client device 118 and the computing environment 103. In some examples, data packets comprising enterprise data 150 are encrypted during transmission over the network 121. Thereafter, the process can proceed to completion.

Figure 5:
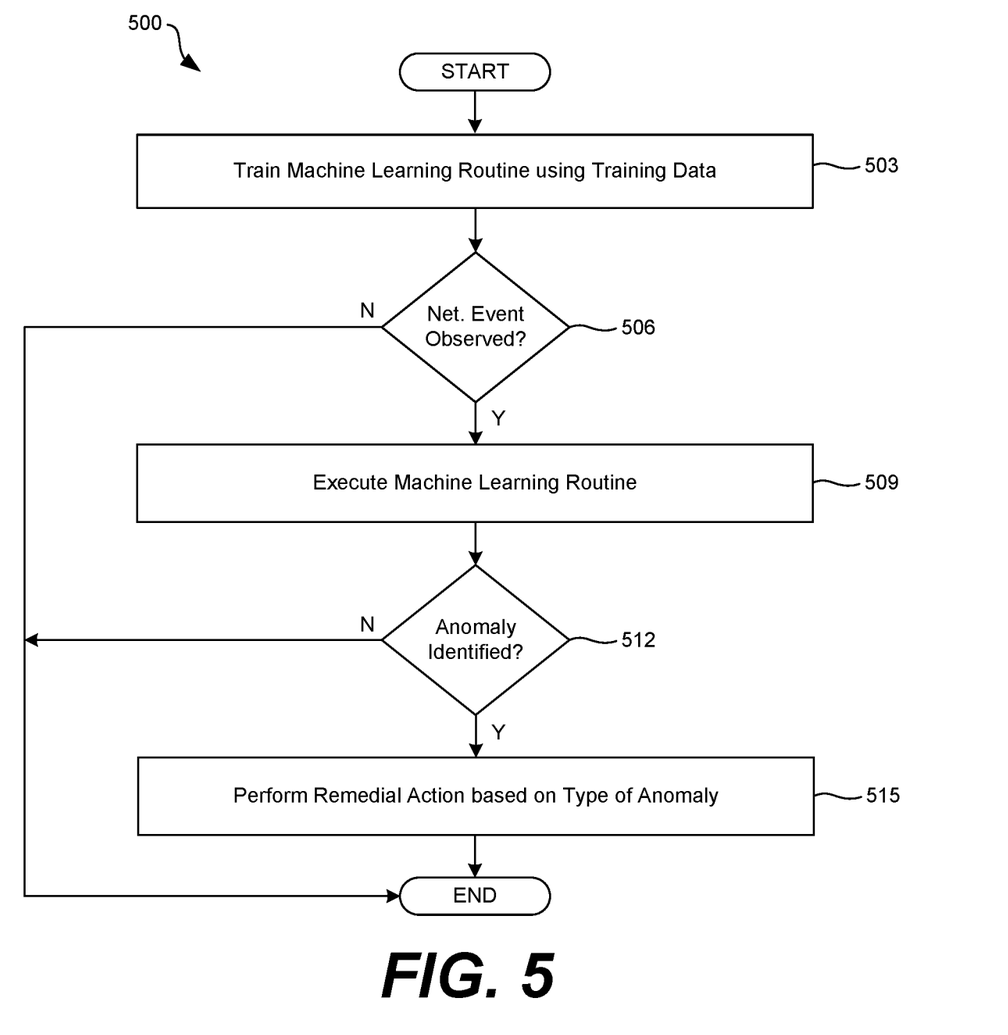
FIG. 5 is a drawing illustrating functionality implemented by a network service or the computing environment of the networked environment of FIG. 1.

Moving on to FIG. 5, a flowchart 500 is shown that provides one example operation of the computing environment 103 according to various examples. The flowchart of FIG. 5 can be viewed as depicting an example of elements of a method implemented by the virtual private network service 109 or the management service 106 executing in the networked environment 100 according to one or more examples. The separation or segmentation of functionality as discussed herein is presented for illustrative purposes only.

In step 503, the computing environment 103 can train a machine learning routine 115 using machine learning training data 172. In some examples, the machine learning routine 115 can be one of a K-nearest neighbor routine, a one class support vector machine routine, an auto-encoder neural network routine, a one-class neural network routine, or other suitable machine learning routine 115. As such, in some examples, the machine learning training data 172 includes historical data describing past interactions with client devices 118, where the data is curated by administrators. In other words, the machine learning training data 172 includes manually verified data regarding anomalies that can be identified based on interactions with the client devices 118.

The training of the machine learning routine 115 can include determining factors, weights for factors, and other information that correlates to a predefined result. In this case, the predefined result can include an anomaly, such as a user of a client device 118 performing a suspect interaction or one that warrants further scrutiny. As such, once trained, the machine learning routine 115 can identify network access anomalies when network interactions are performed on the client devices 118 that deviate from patterns of access for the client device 118.

In step 506, the computing environment 103 can determine whether a network event has been observed, such as a user of a client device 118 accessing a network site in a web browser application, executing a particular client application 144, downloading source code, or other interaction as can be appreciated. For instance, if a user habitually accesses a particular subset of the client applications 144, the machine learning routine 115 can identify when a client application 144 outside of the subset is executed that can trigger an anomaly. If no network events are observed, the process can proceed to completion.

Alternatively, if a network event is observed, the process can proceed to step 509. In step 509, the machine learning routine 115 can be executed using data associated with the network event to identify one or more anomalies. For instance, the inputs of the machine learning routine 115 can include historical usage data associated with the client device 118 and the network event. The machine learning routine 115 can identify whether the network event is routine or extraordinary, requiring further analysis. Accordingly, the machine learning routine 115 is trained over time to create a normalized pattern of user access to internal resources. In one example, if an attacker were to gain access to client device 118 and attempt to perform a bulk download of enterprise data 150, the machine learning routine 115 can identify the bulk download as an anomaly and report the anomaly to the virtual private network service 109.

In step 512, the computing environment 103 can determine whether one or more anomalies were identified as a result of the machine learning routine 155. If no anomalies are identified, the process can proceed to completion. Alternatively, if an anomaly is identified, the process can proceed to step 515. In step 515, the computing environment 103 can perform a remedial action, for instance, based on a type of anomaly.

In one example, the virtual private network service 109 can pause or terminate the virtual private network connection. More specifically, the virtual private network service 109 can send a control message to the virtual private network application 153 on the client device 118 directing the client device 118 to pause a flow of network traffic subject to a re-authentication of a user of the client device 118. The virtual private network service 109 can, at the same time, direct an end the management service 106 to lock the client device 118 using, for instance, a UUID for the client device 118.

In further examples, the virtual private network application 153 can employ an enterprise identity manager to trigger user verification. For instance, the enterprise identity manager can send an email, text message, or similar communication comprising a verification hyperlink to an enterprise email account for the user of the client device 118. If the user reauthenticates using the hyperlink, for example, an enterprise email client application, the virtual private network service 109 can notify the virtual private network application 153 indicating that the client device 118 has been verified. As such, the virtual private network connection can be reestablished. Thereafter, the process can proceed to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 118 can include a display upon which a user interface generated by a client application 144, management service 106, or another application can be rendered. In some examples, the user interface can be generated with user interface data provided by the computing environment 103. The client devices 118 can also include one or more input/output devices that can include, for example, a capacitive touchscreen or other type of touch input device, fingerprint reader, or keyboard.

Although the management service 106, the virtual private network service 109, client applications 144, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

The invention claimed is:

1. A system, comprising:
   at least one computing device; and
   program instructions stored in memory of the at least one computing device and executable by the at least one computing device that, when executed, direct the at least one computing device to at least:
   authenticate a client device for using a virtual private network (VPN) for network communications, wherein the authentication is based on a first device identifier (ID) received from the client device and on a second device ID generated by a management service executing on the at least one computing device;
   train a machine learning (ML) routine to identify a pattern from past network communications of the client device;
   in response to observing a new network communication of the client device, determine, using the trained ML routine, that the new network communication is an anomaly;
   in response to determining that the new network communication is an anomaly: pause the VPN from being used by the client device for the network communications, and instruct the client device to reauthenticate with the at least one computing device to resume using the VPN, wherein pausing the VPN includes sending a control message to pause network traffic, to a VPN application residing on the client device; and
   in response to the client device reauthenticating with the at least one computing device: resume the network communications of the client device using the VPN, and further train the ML routine using the anomaly.

2. The system of claim 1, wherein the ML routine is trained by inputting into the ML routine, historical data describing the past network communications of the client device.

3. The system of claim 1, wherein authenticating the client device for using the VPN includes: receiving the first device ID and the second device ID from the client device, transmitting the first device ID to the management service, and receiving the second device ID from the management service.

4. The system of claim 1, wherein pausing the VPN and instructing the client device to reauthenticate, include transmitting the control message to the VPN application executing on the client device, the control message directing the client device to pause a flow of network traffic and to reauthenticate.

5. The system of claim 1, wherein resuming the network communications of the client device using the VPN includes notifying the VPN application executing on the client device, that the client device has been verified based on a hyperlink transmitted to the client device.

6. A computer-implemented method, comprising:
   authenticating a client device for using a virtual private network (VPN) for network communications, wherein the authentication is based on a first device identifier (ID) received from the client device and on a second device ID generated by a management service executing on at least one computing device;
   training a machine learning (ML) routine to identify a pattern from past network communications of the client device;
   in response to observing a new network communication of the client device, determining, using the trained ML routine, that the new network communication is an anomaly;
   in response to determining that the new network communication is an anomaly: pausing the VPN from being used by the client device for the network communications, and instructing the client device to reauthenticate with the at least one computing device to resume using the VPN, wherein pausing the VPN includes sending a control message to pause network traffic, to a VPN application residing on the client device; and
   in response to the client device reauthenticating with the at least one computing device: resuming the network communications of the client device using the VPN, and further training the ML routine using the anomaly.

7. The computer-implemented method of claim 6, wherein the ML routine is trained by inputting into the ML routine, historical data describing the past network communications of the client device.

8. The computer-implemented method of claim 6, wherein authenticating the client device for using the VPN includes: receiving the first device ID and the second device ID from the client device, transmitting the first device ID to the management service, and receiving the second device ID from the management service.

9. The computer-implemented method of claim 6, wherein pausing the VPN and instructing the client device to reauthenticate, include transmitting the control message to the VPN application executing on the client device, the control message directing the client device to pause a flow of network traffic and to reauthenticate.

10. The computer-implemented method of claim 6, wherein resuming the network communications of the client device using the VPN includes notifying the VPN application executing on the client device, that the client device has been verified based on a hyperlink transmitted to the client device.

11. A non-transitory computer-readable medium comprising program instructions stored thereon executable in a computing device that, when executed, direct the computing device to at least:
    authenticate a client device for using a virtual private network (VPN) for network communications, wherein the authentication is based on a first device identifier (ID) received from the client device and on a second device ID generated by a management service executing on the computing device;
    train a machine learning (ML) routine to identify a pattern from past network communications of the client device;
    in response to observing a new network communication of the client device, determine, using the trained ML routine, that the new network communication is an anomaly;
    in response to determining that the new network communication is an anomaly: pause the VPN from being used by the client device for the network communications, and instruct the client device to reauthenticate with the computing device to resume using the VPN, wherein pausing the VPN includes sending a control message to pause network traffic, to a VPN application residing on the client device; and
    in response to the client device reauthenticating with the computing device: resume the network communications of the client device using the VPN, and further train the ML routine using the anomaly.

12. The non-transitory computer-readable medium of claim 11, wherein the ML routine is trained by inputting into the ML routine, historical data describing the past network communications of the client device.

13. The non-transitory computer-readable medium of claim 11, wherein authenticating the client device for using the VPN includes: receiving the first device ID and the second device ID from the client device, transmitting the first device ID to the management service, and receiving the second device ID from the management service.

14. The non-transitory computer-readable medium of claim 11, wherein pausing the VPN and instructing the client device to reauthenticate, include transmitting the control message to the VPN application executing on the client device, the control message directing the client device to pause a flow of network traffic and to reauthenticate.

15. The non-transitory computer-readable medium of claim 11, wherein resuming the network communications of the client device using the VPN includes notifying the VPN application executing on the client device, that the client device has been verified based on a hyperlink transmitted to the client device.

16. The system of claim 3, wherein authenticating the client device for using the VPN further includes determining that the second device ID received from the client device matches the second device ID received from the management service.

17. The system of claim 1, wherein the program instructions, when executed, further direct the at least one computing device to at least:
    upon authenticating the client device for using the VPN, encrypt data and transmit the encrypted data to the client device using the VPN.

18. The computer-implemented method of claim 8, wherein authenticating the client device for using the VPN further includes determining that the second device ID received from the client device matches the second device ID received from the management service.

19. The computer-implemented method of claim 6, further comprising:
    upon authenticating the client device for using the VPN, encrypting data and transmitting the encrypted data to the client device using the VPN.

20. The non-transitory computer-readable medium of claim 13, wherein authenticating the client device for using the VPN further includes determining that the second device ID received from the client device matches the second device ID received from the management service.

\* \* \* \* \*